US012170071B2

(12) United States Patent
Zhang et al.

(10) Patent No.: US 12,170,071 B2
(45) Date of Patent: Dec. 17, 2024

(54) SOFTWARE VSYNC FILTERING

(71) Applicant: QUALCOMM Incorporated, San Diego, CA (US)

(72) Inventors: Nan Zhang, Beijing (CN); Long Han, Shanghai (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/424,699

(22) Filed: Jan. 26, 2024

(65) Prior Publication Data

US 2024/0242690 A1 Jul. 18, 2024

Related U.S. Application Data

(63) Continuation of application No. 17/758,286, filed as application No. PCT/CN2020/141179 on Dec. 30, 2020, now Pat. No. 11,935,502.

(30) Foreign Application Priority Data

Dec. 31, 2019 (WO) ................ PCT/CN2019/130447

(51) Int. Cl.
*G09G 3/36* (2006.01)
*G09G 5/00* (2006.01)
*G09G 5/18* (2006.01)

(52) U.S. Cl.
CPC ............... *G09G 5/005* (2013.01); *G09G 5/18* (2013.01)

(58) Field of Classification Search
CPC .................................. G09G 5/05; G09G 5/18
(Continued)

(56) References Cited

U.S. PATENT DOCUMENTS

2006/0256821 A1 11/2006 Richards
2011/0019092 A1 1/2011 Bridges et al.
(Continued)

FOREIGN PATENT DOCUMENTS

CN 107220019 A 9/2017
CN 110018874 A 7/2019
(Continued)

OTHER PUBLICATIONS

Garbe M., "Introduction to the Android Graphics Pipeline", University of Applied Sciences, Mar. 1, 2014, 88 Pages, XP055845604, p. 27, line 1-line 14.
(Continued)

*Primary Examiner* — Jonathan M Blancha
(74) *Attorney, Agent, or Firm* — Arent Fox, LLP

(57) ABSTRACT

Methods and apparatuses are provided for alignment of hardware and software Vsync signals through filtering out delayed timestamp signals in a hardware timestamp signal used to generate the software Vsync. The alignment may occur when a display client is operating in a video mode but not a command mode. A compositor or processing unit may receive a hardware Vsync signal from a display using a video mode, generate a hardware timestamp signal based on the hardware Vsync signal, determine a delay for a pulse in the hardware timestamp signal based on a delay for a set of previous frames, determine whether the delay for the pulse is over a threshold, and control rendering and transmission of a frame to the display based on the delay for the pulse being over the threshold. Thus, accurate Vsync signal synchronization may occur.

20 Claims, 5 Drawing Sheets

(58) Field of Classification Search
USPC .......................................................... 345/99
See application file for complete search history.

(56) References Cited

U.S. PATENT DOCUMENTS

| | | | |
|---|---|---|---|
| 2013/0057763 A1 | 3/2013 | Cha et al. | |
| 2013/0321701 A1 | 12/2013 | Halna Du Fretay et al. | |
| 2014/0168229 A1 | 6/2014 | Ungureanu et al. | |
| 2015/0046617 A1* | 2/2015 | Shirlen | G06F 11/3466 710/117 |
| 2016/0006526 A1* | 1/2016 | Cho | H04J 3/0667 370/503 |
| 2016/0127614 A1 | 5/2016 | Molnar | |
| 2016/0301961 A1 | 10/2016 | Ping et al. | |
| 2018/0054593 A1 | 2/2018 | Lai et al. | |
| 2019/0122327 A1 | 4/2019 | Jeon et al. | |
| 2022/0116678 A1 | 4/2022 | Tyamgondlu et al. | |
| 2023/0058899 A1 | 2/2023 | Zhang et al. | |

FOREIGN PATENT DOCUMENTS

| | | |
|---|---|---|
| CN | 110381350 A | 10/2019 |
| WO | 2018093466 A1 | 5/2018 |

OTHER PUBLICATIONS

International Preliminary Report on Patentability—PCT/CN2019/130447—The International Bureau of WIPO—Geneva, Switzerland—Jul. 14, 2022.
International Preliminary Report on Patentability—PCT/CN2020/141179—The International Bureau of WIPO—Geneva, Switzerland—Jul. 14, 2022.
International Search Report and Written Opinion—PCT/CN2019/130447—ISA/EPO—Sep. 25, 2020.
International Search Report and Written Opinion—PCT/CN2020/141179—ISA/EPO—Apr. 2, 2021.
Supplementary European Search Report—EP20908995—Search Authority—The Hague—Jan. 2, 2024.

* cited by examiner

SOFTWARE VSYNC FILTERING

CROSS REFERENCE TO RELATED APPLICATIONS

This application is continuation of U.S. application Ser. No. 17/758,286, entitled "SOFTWARE VSYNC FILTERING" and filed on Jun. 30, 2022, which is a National Phase entry of PCT Application No. PCT/CN2020/141179, entitled "SOFTWARE VSYNC FILTERING" and filed on Dec. 30, 2020, which claims priority of PCT Application No. PCT/CN2019/130447, entitled "METHODS AND APPARATUS TO FACILITATE FRAME PER SECOND RATE SWITCHING VIA TOUCH EVENT SIGNALS" and filed on Dec. 31, 2019, all of which are expressly incorporated by reference herein in their entirety.

TECHNICAL FIELD

The present disclosure relates generally to processing systems and, more particularly, to one or more techniques for display or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processor, a display processing unit (DPU), a graphics processing unit (GPU), or a video processor. The apparatus may receive a hardware Vsync signal from a display, generate a hardware timestamp signal based on the hardware Vsync signal, determine an error for a pulse in the hardware timestamp signal, determine whether the error for the pulse is over a threshold, synchronize a software Vsync signal based on the hardware timestamp signal, wherein the pulse of the hardware timestamp signal is ignored in synchronization based on whether the error is above the threshold, and control rendering and transmission of a frame to the display based on the synchronized software Vsync signal.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
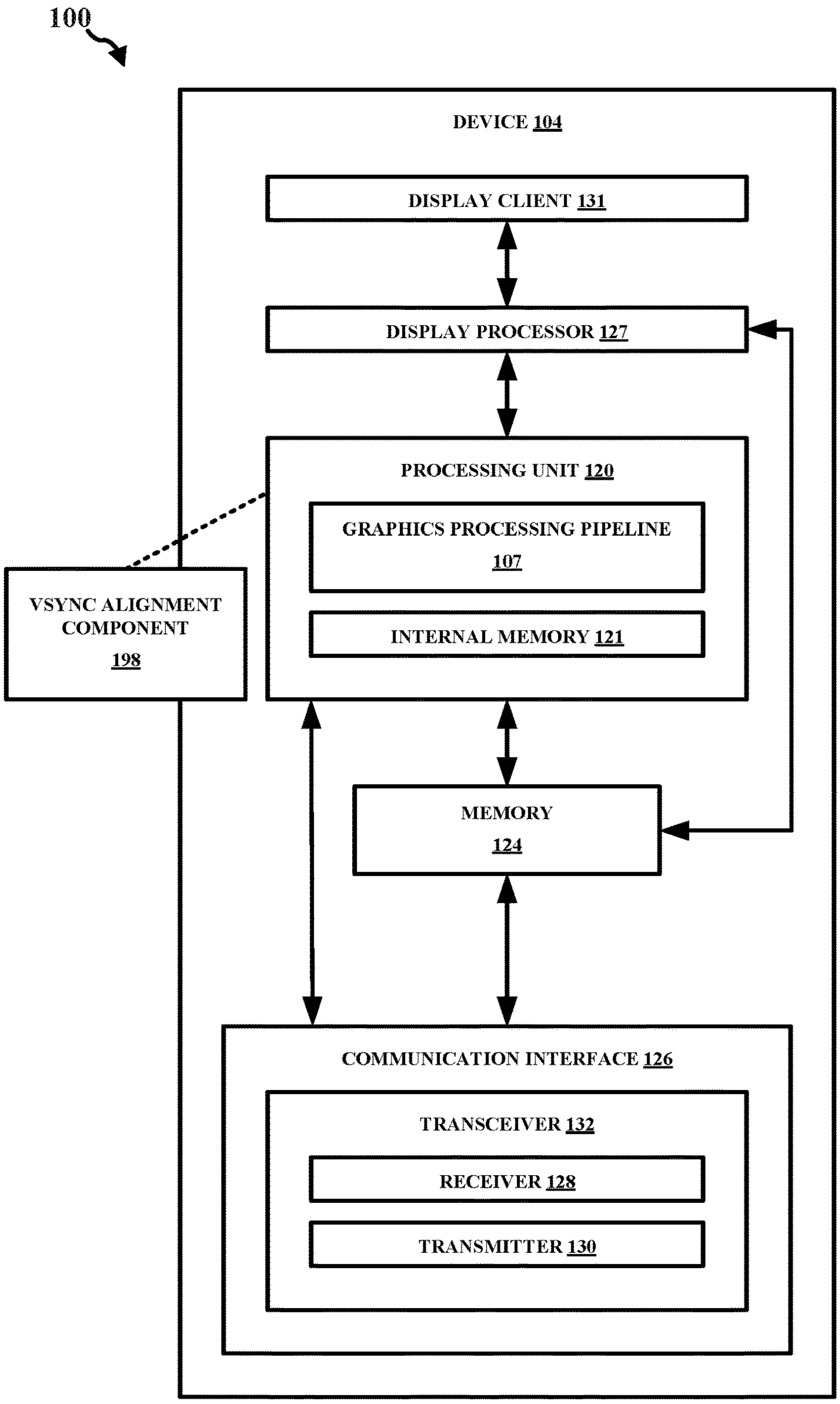
FIG. 1 is a block diagram that illustrates an example content generation system, in accordance with one or more techniques of this disclosure.

In general, examples disclosed herein provide techniques for generating an accurate software Vsync for display processing. In some examples, a compositor receives a hardware Vsync signal from a display. The compositor generates a hardware timestamp signal based on the hardware Vsync signal. The compositor determines an error for a pulse in the hardware timestamp signal. The compositor determines whether the error for the pulse is over a threshold. The compositor synchronizes a software Vsync signal based on the hardware timestamp signal, wherein the pulse of the hardware timestamp signal is ignored in synchronization based on whether the error is above the threshold. Finally, the compositor controls rendering and transmission of a frame to the display based on the synchronized software Vsync signal.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120 and a memory 124. In some aspects, the device 104 can include a number of optional components, e.g., a communication interface 126, a transceiver 132, a receiver 128, a transmitter 130, a display processor 127, and a display client 131. Reference to the display client 131 may refer to one or more displays. For example, the display client 131 may include a single display or multiple displays. The display client 131 may include a first display and a second display. In further examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the display client 131. The display processor 127 may be configured to perform display processing. For example, the display processor 127 may be configured to perform one or more display processing techniques on one or more frames generated by the processing unit 120. The display client 131 may be configured to display or otherwise present frames processed by the display processor 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as memory 124, may be accessible to the processing unit 120. For example, the processing unit 120 may be configured to read from and/or write to external memory, such as the memory 124. The processing unit 120 may be communicatively coupled to the memory 124 over a bus. In some examples, the processing unit 120 and the memory 124 may be communicatively coupled to each other over the bus or a different connection.

It should be appreciated that in some examples, the device 104 may include a content encoder/decoder configured to receive graphical and/or display content from any source, such as the memory 124 and/or the communication interface 126. The memory 124 may be configured to store received encoded or decoded graphical content. In some examples, the content encoder/decoder may be configured to receive encoded or decoded graphical content, e.g., from the memory 124 and/or the communication interface 126, in the form of encoded pixel data. In some examples, the content encoder/decoder may be configured to encode or decode any graphical content.

The internal memory 121 or the memory 124 may include one or more volatile or non-volatile memories or storage devices. In some examples, internal memory 121 or the memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the memory 124 is non-movable or that its contents are static. As one example, the memory 124 may be removed from the device 104 and moved to another device. As another example, the memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

In some examples, the graphical content from the processing unit 120 for display via the display client 131 is not static and may be changing. Accordingly, the display processor 127 may periodically refresh the graphical content displayed via the display client 131. For example, the display processor 127 may periodically retrieve graphical content from the memory 124, where the graphical content may have been updated by the execution of an application (and/or the processing unit 120) that outputs the graphical content to the memory 124.

The rate at which the display processor 127 refreshes the graphical content displayed via the display client 131 may be referred to as the frames per second (FPS) rate or the "display refresh rate." Examples of the display refresh rate include 30 fps, 60 fps, 90 fps, 120 fps, 240 fps, etc.

The processing unit 120 and the display client 131 may operate in synchrony to allow for consistent generation of graphical content and display of the graphical content as display content. To provide synchronization between the two components, the display client 131 may transmit a hardware Vsync to the processing unit 120. The processing unit 120 may generate a software Vsync based on the hardware Vsync and use the software Vsync to control the timing of the processing unit's operation. In some circumstances, the process of generating the software Vsync can be delayed, resulting in the software Vsync being irregular (e.g., out of alignment with the hardware Vsync). The irregular software Vsync may cause frame drops and/or FPS loss in the output of the display client 131.

Referring again to FIG. 1, in certain aspects, the processing unit 120 may include a Vsync alignment component 198 configured to align the software Vsync and the hardware Vsync to prevent the software Vsync from being irregular. For example, the Vsync alignment component 198 may filter out delayed timestamp signals in a hardware timestamp signal used to generate the software Vsync. In some aspects, the Vsync alignment component 198 may align the software Vsync and the hardware Vsync when the display client 131 is operating in video mode, and may not align the software Vsync and the hardware Vsync when the display client 131 is not operating in video mode (e.g., operating in command mode).

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 2:
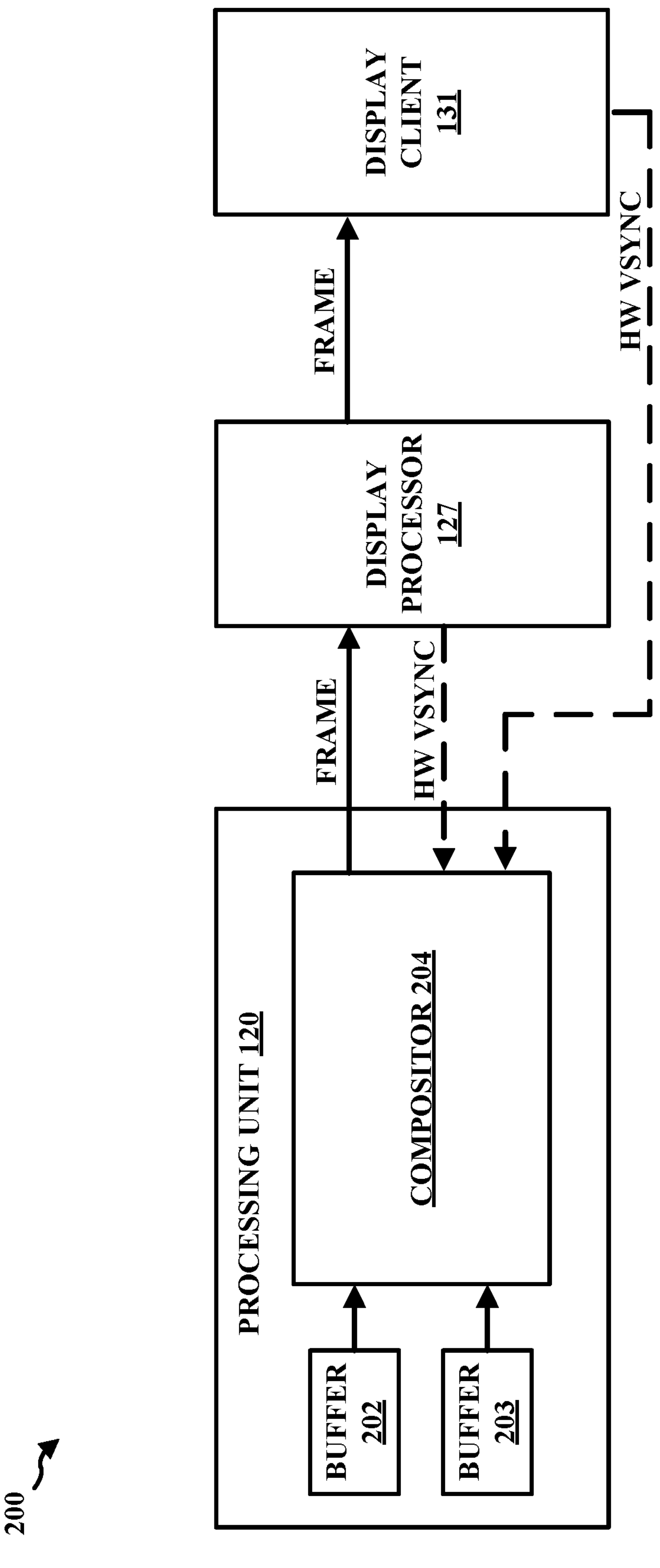
FIG. 2 is a block diagram illustrating the example processing unit of FIG. 1 and the example display client of FIG. 1, in accordance with one or more techniques of this disclosure.

FIG. 2 is a block diagram 200 illustrating the example processing unit 120 of FIG. 1, the example display processor 127 of FIG. 1, and the example display client 131 of FIG. 1. The processing unit 120 may include a compositor 204. The compositor 204 may render frames and may transmit the rendered frames to the display processor 127. For example, the compositor 204 may receive graphical content from a first buffer 202 and from a second buffer 203, and may generate a frame including the graphical content from both the first buffer 202 and the second buffer 203. The compositor 204 may then output the generated frame to the display processor 127. The display processor 127 may perform further processing on the frame and output the frame to the display client 131. In some aspects, the compositor 204 may be SurfaceFlinger in Android® systems.

The compositor 204 may control the synchronization between rendering a frame and transmitting the rendered frame to the display. The compositor 204 may utilize a software Vsync to control the rendering of frames and outputting of frames to the display client 131. In particular, the compositor 204 may utilize the software Vsync to synchronize the timing of rendering a frame and delivering the frame to the display processor 127 or the display client 131. The software Vsync may allow the compositor 204 to synchronize the rendering, composition, and display of the frame with a fixed interval (e.g., based on the framerate of the display client 131).

The compositor 204 may generate the software Vsync based on a hardware Vsync. When operating in video mode, the compositor 204 may generate the software Vsync based on a hardware Vsync received from the display processor 127. When operating in command mode, the compositor 204 may generate the software Vsync based on a hardware Vsync received from the display client 131. Command mode and video mode are discussed in more detail below. The display processor 127 or the display client 131 may transition the hardware Vsync transmitted to the compositor 204 from high to low or from low to high when the display client 131 has finished displaying a frame to allow the compositor 204 and the display client 131 to remain in sync.

Figure 3:
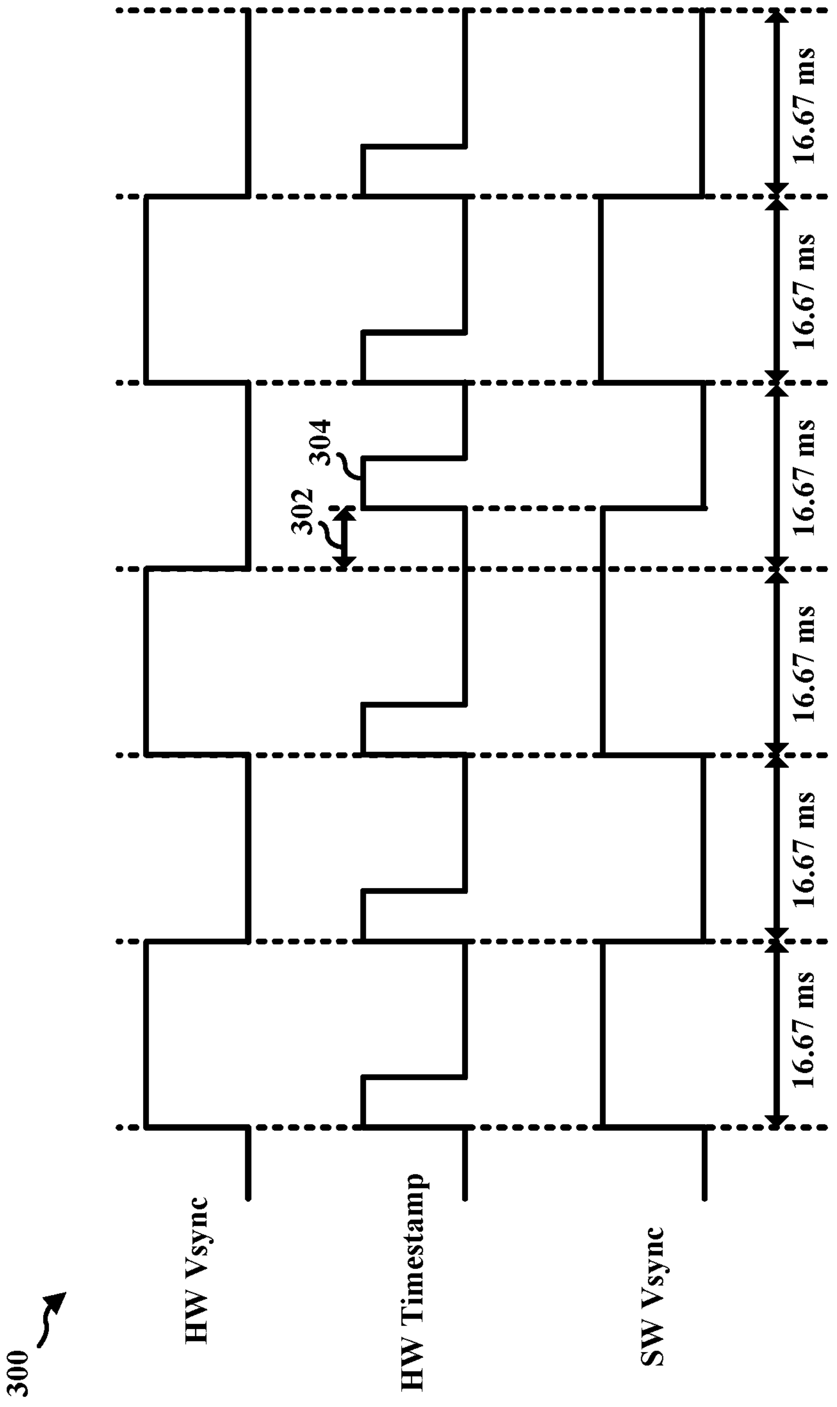
FIG. 3 is a diagram illustrating the relationship between a hardware Vsync, a hardware timestamp signal, and a software Vsync, in accordance with one or more techniques of this disclosure.

FIG. 3 is a diagram 300 illustrating the relationship between a hardware Vsync, a hardware timestamp signal, and a software Vsync. The compositor 204 may determine to update or align the software Vsync, and may generate the hardware time stamp signal to do so. The hardware Vsync may transition between high and low each time a frame is transmitted to/displayed at the display client 131. For example, where the system is operating at 60 FPS, the hardware Vsync may transition every 16.67 ms. To generate the software Vsync, the compositor 204 may generate the hardware timestamp signal (e.g., a retire timestamp signal). When the compositor 204 detects a transition in the hardware Vsync from the display client 131, the compositor 204 includes a pulse on the hardware timestamp signal. The compositor 204 may then utilize the hardware timestamp signal when generating the software Vsync to align the timing between the hardware Vsync and the software Vsync.

The compositor 204 may not always be able to include the pulse on the hardware timestamp signal at the same time as the transition in the hardware Vsync. For example, under normal circumstances, there may be an average delay of 0.15 ms, up to 0.6 ms, between the time the hardware Vsync transitions and when the corresponding pulse is added to the hardware timestamp signal. This delay may be relatively minor, and may be absorbed in the design of the compositor 204 (e.g., absorbed in the design of the software Vsync generation components).

In some aspects, a long delay 302 may occur between when the compositor 204 receives the hardware Vsync and when the compositor 204 includes a corresponding pulse 304 in the hardware timestamp signal. The long delay 302 may be a software delay, in which software of the compositor 204 causes a delay in updating the hardware timestamp signal based on the hardware Vsync. For example, when the processing unit 120 is under a heavy load, frame composition may be delayed which may result in a delay in transmitting the frame to the display and a delay in generating the hardware timestamp signal. In another example, the long delay 302 may be caused by a software bug or deadlock delaying the generating of the hardware timestamp signal. In a further example, the long delay 302 may be based on the hardware interrupt request queue. In some aspects, the long delay 302 may be up to 16 ms. In some aspects, the long delay 302 may be a delay which is between 0.6 ms and 16 ms. In some aspects, the long delay 302 may be a delay which is between 1 ms and 16 ms. In some aspects, the long delay 302 may be any delay over 0.6 ms. The delayed pulse 304 may be referred to as a long-delayed kernel Vsync timestamp. When the software Vsync is synchronized based on the hardware timestamp signal, the delayed pulse 304 may result in an irregular software Vsync. When the compositor 204 utilizes the irregular software Vsync, it may cause a frame drop(s) and/or reduced FPS.

Figure 4:
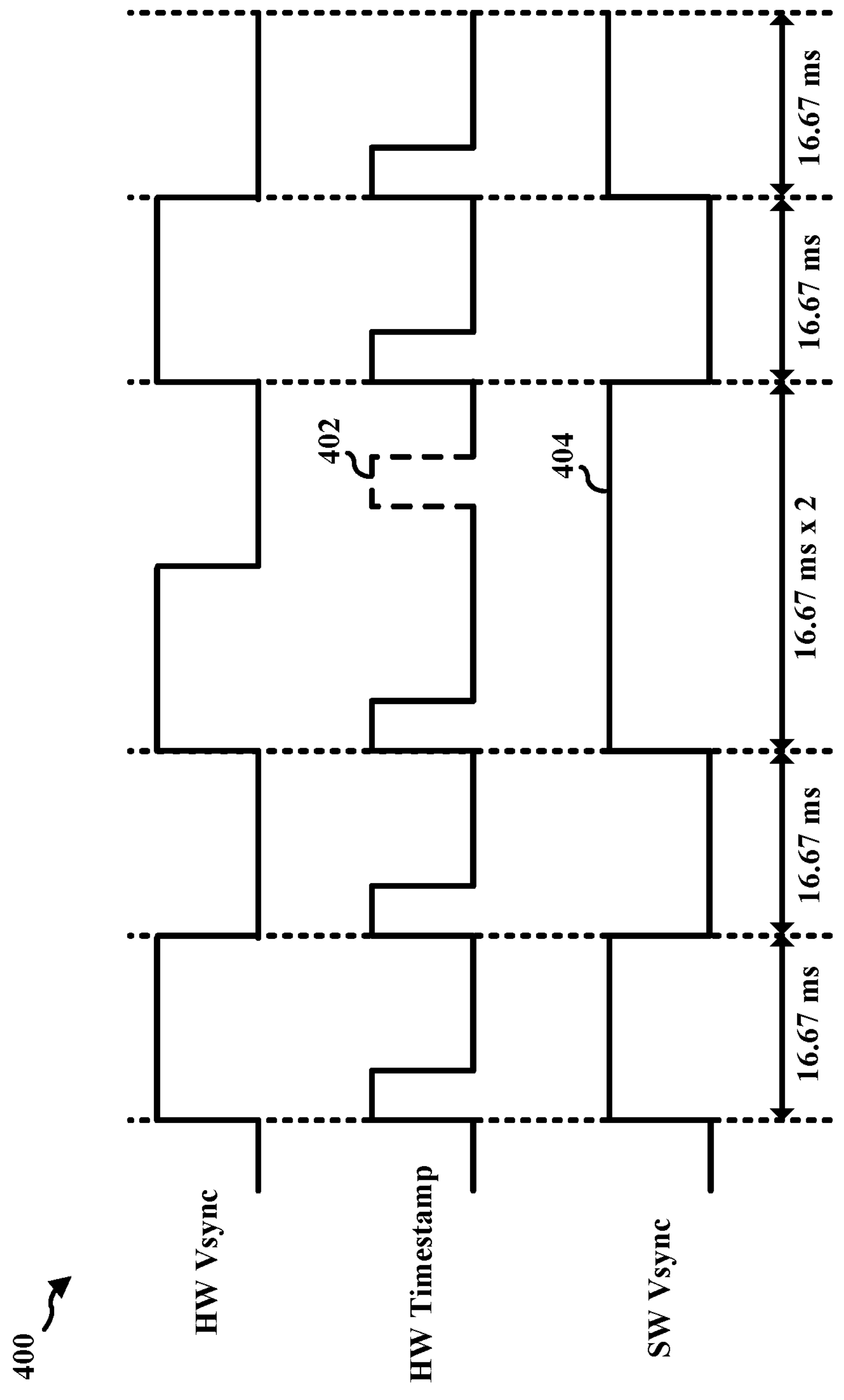
FIG. 4 is a diagram illustrating the relationship between a hardware Vsync, a hardware timestamp signal, and a software Vsync with Vsync alignment, in accordance with one or more techniques of this disclosure.

FIG. 4 is a diagram 400 illustrating the relationship between a hardware Vsync, a hardware timestamp signal, and a software Vsync with Vsync alignment. The compositor 204 may determine an error for each pulse of the hardware timestamp signal, corresponding to the delay between the transition in the hardware Vsync and the pulse.

In some aspects, the error for a pulse may be evaluated based on various statistics such as the average of previous errors. The compositor may determine the delay for a set number of previous frames, and may determine the delay for the current frame based on the delays of the set number of previous frames. For example, where the Vsync transitioned after 16.8 ms, 17.1 ms, 16.1 ms, and 16.2 ms for the last four frames, the compositor 204 may determine that the average Vsync delay for the last four frames was 16.45 ms. The compositor 204 may then determine the error for the delay for the current frame based on the 16.45 ms average for the last four frames.

The compositor 204 may determine whether the error for a given pulse exceeds a threshold. In some aspects, the threshold may be 0.6 ms. For example, as illustrated in FIG. 4, the compositor 204 may determine that the pulse 402 has a delay greater than the threshold. The compositor 204 may thereby detect a pulse delayed by a long delay such as the long delay 302.

The compositor 204 may then synchronize the software Vsync based on the hardware timestamp signal, but may ignore pulses with an error greater than the threshold such as the pulse 402. Where the compositor 204 ignores the pulse 402 in synchronizing the software Vsync, the software Vsync may have a pulse 404 which is an integer of times greater than the normal pulsewidth. For example, as illustrated in FIG. 4, the pulse 404 may have a pulsewidth of 33.34 ms, twice the normal pulsewidth of 16.67 ms. The software Vsync may therefore remain in sync with the hardware Vsync.

In some aspects, the display client 131 may operate in a video mode. In video mode, the processing unit 120 may transmit the pixels to be displayed to the display client 131. In some aspects, the display client 131 may operate in a command mode. In command mode, the processing unit 120 may transmit data to the display client 131 or to the display processor 127, and the display client 131 or the display processor 127 may render the pixels to be displayed based on the data received from the processing unit 120.

In some aspects, the compositor 204 may determine whether the display client 131 is operating in video mode. The compositor 204 may determine the error for pulses of the hardware timestamp signal and ignore pulses over the threshold, as described above, when the display client 131 is operating in video mode. When the display client 131 is operating in video mode, the compositor 204 may generate the software Vsync based on a hardware Vsync signal received from a timing engine (e.g., a mobile display processor timing engine). The timing engine may be a part of the processing unit 120. The timing engine may share a clock source with the compositor 204. Accordingly, there may be little or no time shift between the software Vsync and the hardware Vsync, so the compositor 204 may not need to synchronize the software Vsync frequently. When the display client 131 is not operating in video mode (e.g., when the display client 131 is operating in command mode), the compositor 204 may synchronize the software Vsync based on the hardware timestamp signal as described with respect to FIG. 3, without filtering out pulses with an error exceeding a threshold. When the display client 131 is operating in command mode, the compositor 204 may rely on the software Vsync generated without filtering out pulses as it may not have access to hardware Vsync signal status from the display client 131, and may not be able to determine whether a Vsync timing change is due to a software delay (e.g., is an error) or due to a hardware delay (e.g., is not an error).

Figure 5:
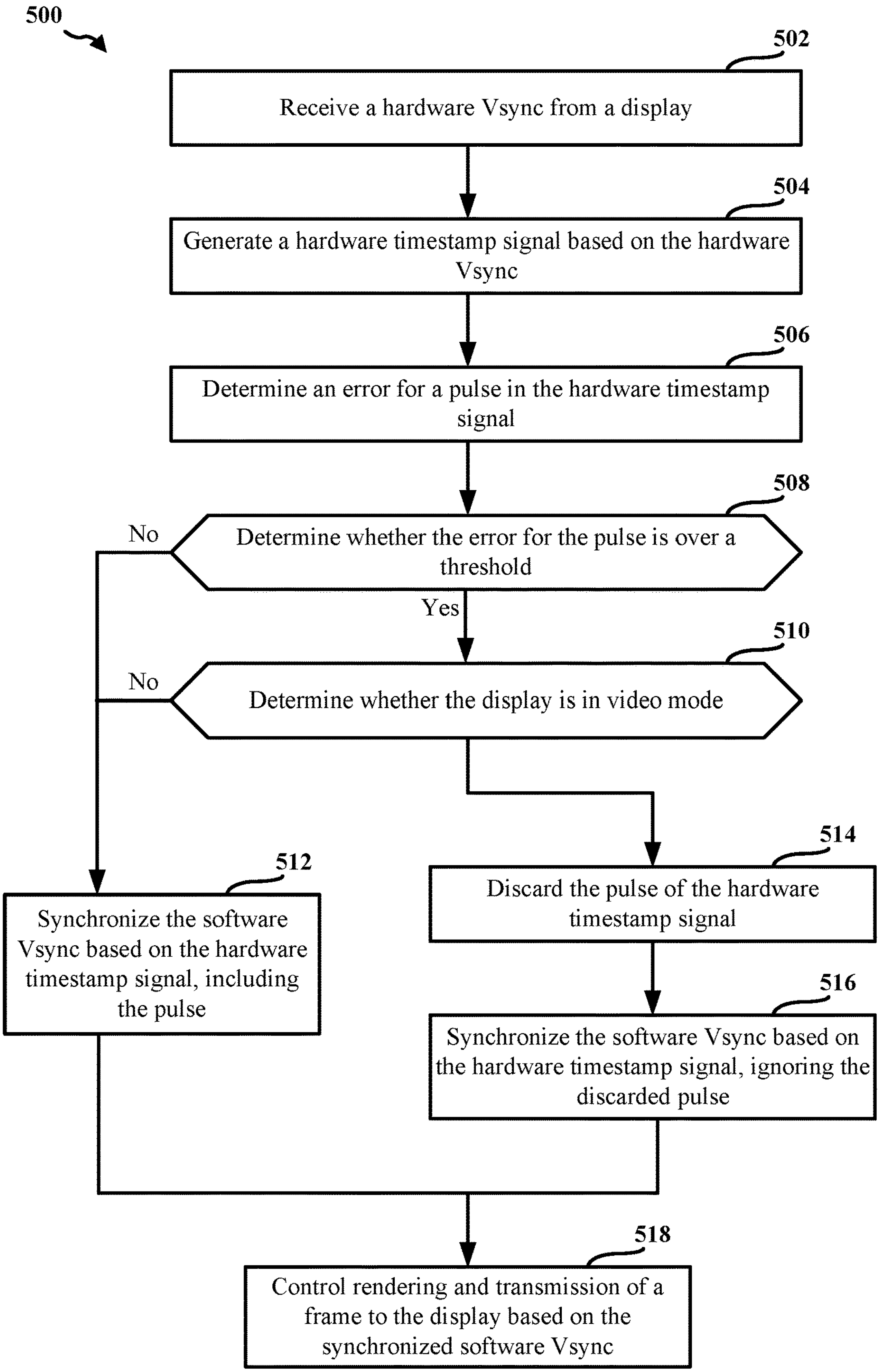
FIG. 5 is a flowchart illustrating an example method, in accordance with one or more techniques of this disclosure.

FIG. 5 is a flowchart 500 illustrating an example method, in accordance with one or more techniques of this disclosure. The method may be performed by an apparatus, such as the device 104 of FIG. 1, the processing unit 120 of FIGS. 1 and/or 2, the display processor 127 of FIG. 1, a GPU, and/or a video processor. The apparatus may be a wireless communication device.

At 502, the apparatus may receive a hardware Vsync from a display. For example, the compositor 204 or the processing unit 120 may receive the hardware Vsync from the display client 131 or the display processor 127.

At 504, the apparatus may generate a hardware timestamp signal based on the hardware Vsync received at 502. The apparatus may include a pulse on the hardware timestamp signal each time the hardware Vsync is detected. For example, the compositor 204 or the processing unit 120 may generate the hardware timestamp signal based on the hardware Vsync received from the display client 131 or the display processor 127.

At 506, the apparatus may determine an error for a pulse in the hardware timestamp signal. For example, the compositor 204 or the processing unit 120 may determine an error for a pulse in the hardware timestamp signal. The error may be an amount of time between when the hardware Vsync was actually received by the compositor 204 and when the pulse was included on the hardware timestamp signal. In some aspects, the error may have been caused by a software delay which resulted in delaying the addition of the pulse to the hardware timestamp signal. In some aspects, the apparatus may determine the error for each pulse of the hardware timestamp signal.

At 508, the apparatus may determine whether the error for the pulse is over a threshold. For example, the compositor 204 or the processing unit 120 may determine whether the error is over a threshold. The threshold may be configured such that the maximum normal delay in the pulse expected in normal operation of the apparatus is not above the threshold, but a long delay is above the threshold. In some aspects, a long delay may refer to a delay that would cause irregularities in the software Vsync. In some aspects, a long delay may refer to a delay resulting from frame composition being delayed based on a heavy load on the processing unit 120, resulting in a delay in transmitting the frame to the display and a delay in generating the hardware timestamp signal. In some aspects, a long delay may refer to a delay resulting from a software bug or deadlock delaying the generating of the hardware timestamp signal. In some aspects, a long delay may refer to a delay based on the hardware interrupt request queue. For example, the threshold may be 0.6 ms.

At 510, the apparatus may determine whether the display is operating in video mode. For example, in some aspects, the processing unit 120 may determine whether the display client 131 is operating in video mode.

FIG. 5 illustrates the apparatus determining an error for a pulse at 506, determining the error for the pulse is over a threshold at 508, and, if the error was over the threshold at 508, determining whether the display is in video mode at 510 (e.g., whether the apparatus performs the step of determining whether the display is in video mode may be contingent upon the error pulse being over the threshold). In some other aspects, the apparatus may determine whether the display is in video mode prior to determining an error for the pulse in the hardware timestamp signal and determining whether the error is over a threshold. In such aspects, whether the apparatus performs the steps of determining the error for the pulse and determining whether the error is over the threshold may be contingent upon determining that the display is in video mode, and may be performed upon determining that the display is in video mode.

If, at 508, the apparatus determined that the error was not over the threshold or, at 510, the apparatus determined that the display was not operating in video mode, then at 512, the apparatus may synchronize the software Vsync based on the hardware timestamp signal, including the pulse. For example, the compositor 204 or the processing unit 120 may synchronize the software Vsync as described with respect to FIG. 3.

If, at 508, the apparatus determined that the error was over the threshold and, at 510, the apparatus determined that the display was operating in video mode, then at 514, the apparatus may discard the pulse of the hardware timestamp signal. At 516, the apparatus may synchronize the software Vsync based on the hardware timestamp signal, ignoring the discarded pulse. For example, the compositor 204 or the processing unit 120 may synchronize the software Vsync as described above with respect to FIG. 4. As the apparatus synchronizes the software Vsync based only on pulses of the hardware timestamp signal which are not delayed from the hardware Vsync or which only have a negligible, expected delay from the hardware Vsync, the software Vsync can be accurately synchronized with the hardware Vsync.

At 518, the apparatus may control rendering and transmission of a frame to the display based on the synchronized software Vsync. For example, the compositor 204 or the processing unit 120 may control rendering and transmission of a frame to the display client 131 based on the synchronized software Vsync.

In accordance with this disclosure, the term “or” may be interrupted as “and/or” where context does not dictate otherwise. Additionally, while phrases such as “one or more” or “at least one” or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term “processing unit” has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term “processor,” as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

The following examples are illustrative only and may be combined with aspects of other embodiments or teachings described herein, without limitation.

Example 1 is a method of display processing, comprising: receiving a hardware Vsync signal from a display; generating a hardware timestamp signal based on the hardware Vsync signal; determining an error for a pulse in the hardware timestamp signal; determining whether the error for the pulse is over a threshold; synchronizing a software Vsync signal based on the hardware timestamp signal, wherein the pulse of the hardware timestamp signal is ignored in synchronization based on whether the error is above the threshold; and controlling rendering and transmission of a frame to the display based on the synchronized software Vsync signal.

Example 2 is the method of Example 1, wherein the pulse of the hardware timestamp signal is ignored in synchronization further based on whether the display is in video mode.

Example 3 is the method of Examples 1 and 2, wherein the pulse is ignored if the error is above the threshold and the display is in video mode.

Example 4 is the method of any of Examples 1 to 3, wherein determining the error for the pulse is based on determining that the display is not in video mode.

Example 5 is an apparatus for display processing, comprising: a memory; and at least one processor coupled to the memory and configured to: receive a hardware Vsync signal from a display; generate a hardware timestamp signal based on the hardware Vsync signal; determine an error for a pulse in the hardware timestamp signal; determine whether the error for the pulse is over a threshold; synchronize a software Vsync signal based on the hardware timestamp signal, wherein the pulse of the hardware timestamp signal is ignored in synchronization based on whether the error is above the threshold; and control rendering and transmission of a frame to the display based on the synchronized software Vsync signal.

Example 6 is the apparatus of Example 5, wherein the pulse of the hardware timestamp signal is ignored in synchronization further based on whether the display is in video mode.

Example 7 is the apparatus of Examples 5 and 6, wherein the pulse is ignored if the error is above the threshold and the display is in video mode.

Example 8 is the apparatus of any of Examples 5 to 7, wherein the at least one processor is configured to determine the error for the pulse based on determining that the display is not in video mode.

Example 9 is a non-transitory computer-readable medium storing computer executable code for display processing, comprising code to: receive a hardware Vsync signal from a display; generate a hardware timestamp signal based on the hardware Vsync signal; determine an error for a pulse in the hardware timestamp signal; determine whether the error for the pulse is over a threshold; synchronize a software Vsync signal based on the hardware timestamp signal, wherein the pulse of the hardware timestamp signal is ignored in synchronization based on whether the error is above the threshold; and control rendering and transmission of a frame to the display based on the synchronized software Vsync signal.

Example 10 is the non-transitory computer-readable medium of Example 9, wherein the pulse of the hardware timestamp signal is ignored in synchronization further based on whether the display is in video mode.

Example 11 is the non-transitory computer-readable medium of Examples 9 and 10, wherein the pulse is ignored if the error is above the threshold and the display is in video mode.

Example 12 is the non-transitory computer-readable medium of any of Examples 9 to 11, wherein the code is to determine the error for the pulse based on determining that the display is not in video mode.

Example 13 is an apparatus for display processing, comprising: a memory; and at least one processor coupled to the memory and configured to: receive a hardware Vsync signal from a display; determine whether the display is in video mode or command mode; generate a hardware timestamp signal based on the hardware Vsync signal; determine an error for a pulse in the hardware timestamp signal; upon determining that the display is in video mode, determine whether the error for the pulse is over a threshold; synchronize a software Vsync signal based on the hardware timestamp signal, wherein the pulse of the hardware timestamp signal is ignored in synchronization based on whether the error is above the threshold if the display is in video mode; and control rendering and transmission of a frame to the display based on the synchronized software Vsync signal.

Example 14 is the apparatus of Example 13, wherein the pulse of the hardware timestamp signal is ignored in synchronization if the error is above the threshold and the display is in video mode.

Example 15 is the apparatus of Examples 13 and 14, wherein determining the error for the pulse is based on determining that the display is in video mode.

Example 16 is the apparatus of any of Examples 13 to 15, wherein the apparatus is a wireless communication device.

Various examples have been described. These and other examples are within the scope of the following claims.

What is claimed is:

1. A method of display processing, comprising:
receiving a hardware Vsync signal from a display using a video mode;
generating a hardware timestamp signal based on the hardware Vsync signal;
determining a delay for a pulse in the hardware timestamp signal based on a delay for a set of previous frames;
determining whether the delay for the pulse is over a threshold; and
controlling rendering and transmission of a frame to the display based on the delay for the pulse being over the threshold.

2. The method of claim 1, wherein the determining the delay for the pulse is based on a statistic of the delay for the set of previous frames.

3. The method of claim 1, wherein the determining whether the delay for the pulse is over the threshold is based on the display not using a command mode.

4. The method of claim 3, wherein the video mode is a mode in which pixels are transmitted to the display to be displayed, and the command mode is a mode in which data is transmitted to the display to render pixels to be displayed based on the data.

5. The method of claim 1, wherein the delay for the pulse is an amount of time between reception of the hardware Vsync signal and inclusion of the pulse in the hardware timestamp signal.

6. The method of claim 1, wherein the determining the delay for the pulse is based on a determination that the display uses the video mode.

7. The method of claim 1, wherein the determining whether the delay for the pulse is over the threshold is based on a determination that the display uses the video mode.

8. The method of claim 1, wherein the display is determined to use the video mode based on a determination that the delay for the pulse is over the threshold.

9. An apparatus for display processing, comprising:
one or more memories; and
one or more processors each coupled to at least one of the one or more memories, the one or more processors, individually or in combination, configured to:
receive a hardware Vsync signal from a display using a video mode;
generate a hardware timestamp signal based on the hardware Vsync signal;
determine a delay for a pulse in the hardware timestamp signal based on a delay for a set of previous frames;
determine whether the delay for the pulse is over a threshold; and
control rendering and transmission of a frame to the display based on the delay for the pulse being over the threshold.

10. The apparatus of claim 9, wherein the one or more processors, individually or in combination, are configured to determine the delay for the pulse based on a statistic of the delay for the set of previous frames.

11. The apparatus of claim 9, wherein the one or more processors, individually or in combination, are configured to determine whether the delay for the pulse is over the threshold based on the display not using a command mode.

12. The apparatus of claim 11, wherein the video mode is a mode in which pixels are transmitted to the display to be displayed, and the command mode is a mode in which data is transmitted to the display to render pixels to be displayed based on the data.

13. The apparatus of claim 9, wherein the delay for the pulse is an amount of time between reception of the hardware Vsync signal and inclusion of the pulse in the hardware timestamp signal.

14. The apparatus of claim 9, wherein the one or more processors, individually or in combination, are configured to determine the delay for the pulse based on a determination that the display uses the video mode.

15. The apparatus of claim 9, wherein the one or more processors, individually or in combination, are configured to determine whether the delay for the pulse is over the threshold based on a determination that the display uses the video mode.

16. The apparatus of claim 9, wherein the display is determined to use the video mode based on a determination that the delay is over the threshold.

17. An apparatus for display processing, comprising:

one or more memories; and one or more processors each coupled to at least one of the one or more memories, the one or more processors, individually or in combination, configured to:

receive a hardware Vsync signal from a display using a video mode;

generate a hardware timestamp signal based on the hardware Vsync signal;

determine a delay for a pulse in the hardware timestamp signal based on a statistic of a delay for a set of previous frames, the delay for the pulse being an amount of time between reception of the hardware Vsync signal and inclusion of the pulse in the hardware timestamp signal;

determine whether the delay for the pulse is over a threshold; and control rendering and transmission of a frame to the display based on the delay for the pulse being over the threshold.

18. The apparatus of claim 17, wherein the one or more processors, individually or in combination, are configured to determine whether the delay for the pulse is over the threshold based on the display not using a command mode.

19. The apparatus of claim 18, wherein the video mode is a mode in which pixels are transmitted to the display to be displayed, and the command mode is a mode in which data is transmitted to the display to render pixels to be displayed based on the data.

20. The apparatus of claim 17, wherein the one or more processors, individually or in combination, are configured to determine the delay for the pulse based on a determination that the display uses the video mode.

* * * * *